United States Patent
Marcone

(10) Patent No.: US 6,367,236 B1
(45) Date of Patent: Apr. 9, 2002

(54) RAKE AND SHOVEL COMBINATION

(76) Inventor: Louis J. Marcone, 3865 Culver Rd., Rochester, NY (US) 14622

( * ) Notice: Subject to any disclaimer, the term of this patent is extended or adjusted under 35 U.S.C. 154(b) by 0 days.

(21) Appl. No.: 09/625,036

(22) Filed: Jul. 24, 2000

(51) Int. Cl.[7] .............................. A01B 1/20; A01D 7/06
(52) U.S. Cl. .................................. 56/400.12; 56/400.04
(58) Field of Search ...................... 56/400.04, 400.06, 56/400.07, 400.12, 400.16, 400.2; 294/51, 50.6, 50.8, 50.9

(56) References Cited

U.S. PATENT DOCUMENTS

| | | |
|---|---|---|
| 2,891,374 A | 6/1959 | Richmond |
| 5,303,536 A | 4/1994 | Tolliver |
| 5,564,267 A | 10/1996 | Bricker et al. |
| 5,788,299 A | 8/1998 | Wilkinson |
| 5,881,545 A * | 3/1999 | Wilson ..................... 56/400.12 |
| 5,901,540 A | 5/1999 | Vella |
| 5,918,920 A | 7/1999 | Tamburro, Sr. |
| 6,134,869 A * | 10/2000 | Barrett ..................... 56/400.12 |

* cited by examiner

Primary Examiner—Robert E. Pezzuto

(57) ABSTRACT

A combination lawn rake and shovel, includes a hollow rake handle with a rake head pivotally mounted on its lower end for movement between a rake position and a raised position. A rake control lever on the rake handle is connected to one end of a control rod within the rake handle, and the control rod is connected at its other end to the rake head. The control lever is effective to move the rake head between its rake position and its raised position. A shovel is pivotally connected to the rake handle for movement between a shovel position and a storage position. Spring clips secure the shovel handle to the rake handle in both its shovel position and its storage position.

11 Claims, 1 Drawing Sheet

RAKE AND SHOVEL COMBINATION

BACKGROUND OF THE INVENTION

This invention is a combination rake and shovel or, as I call it, a "shovel rake". The device is intended primarily for lawn care.

Lawn raking typically involves using a rake to gather leaves or grass cuttings into piles, then using a separate implement such as a shovel or pitchfork to load the piled leaves or grass onto a sheet or into a container for transport to the roadside.

This alternating use of rake and shovel requires the worker repeatedly to set one tool down and pick up the other. This is not only fatiguing, but for people with back trouble, it can be difficult and painful.

SUMMARY OF THE INVENTION

A combination lawn rake and shovel, according to this invention includes a rake handle with a rake head pivotally mounted on its lower end for movement between a rake position and a raised position. A control lever on the rake handle is operatively connected to the rake head to move the rake head between its rake position and its raised position. A shovel is pivotally connected to the rake handle for movement between a shovel position and a storage posiition, with spring clips to secure the shovel handle to the rake handle in both its shovel position and its storage position.

DETAILED DESCRIPTION

Figure 1:
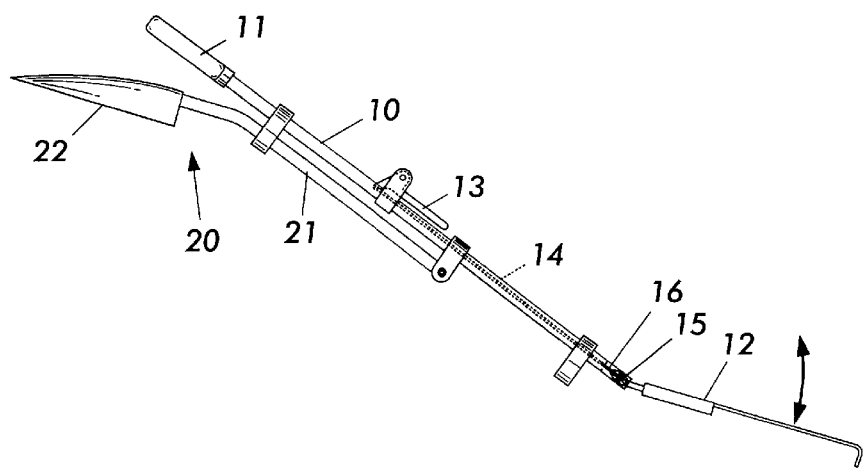
FIG. 1 is a side view of my shovel rake in condition for raking.
Figure 2:
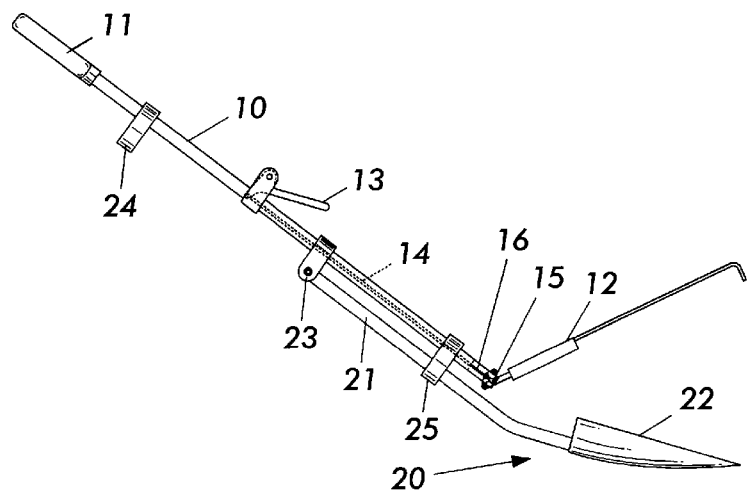
FIG. 2 is a side view of my shovel rake in condition for shoveling, or picking up, piles of raked leaves or grass.

Referring to FIG. 1 and FIG. 2, my shovel rake includes an elongated hollow tubular handle 10 with a rubber grip 11 on its upper end. A rake head 12 is mounted on the lower end of the handle 10 for pivotal movement, indicated by the arrow, between a working or rake position as shown, and a raised position. Pivotal movement is about 40° between the rake position (FIG. 1) and raised position (FIG. 2) of the rake head 12.

A rake control mechanism includes a control lever 13 pivotally mounted at an intermediate location on the handle 10, and connected to the upper end of a push-pull control rod 14 within the tubular handle 10. The lower end of the control rod 14 extends out of the lower end of the handle 10, and is connected, by a compression spring 16, to a multi-hinge linkage 15 which in turn is connected to the rake head 12. In FIG. 1, the control lever 13 is flat on the rake handle 10, pulling the control rod 14 upward and pulling the rake head 12 into its rake position. In FIG. 2, the control lever 13 is pulled up, pushing the control rod 14 downward against the linkage 15, and swinging the rake head 12 up to its raised position.

A shovel 20 includes a handle 21 and a shovel head 22, which may be either solid or tined. The shovel handle 21 is pivotally mounted to the rake handle 10 by a hinge bracket 23 at an intermediate location on the rake handle 10. In FIG. 1, the shovel 20 is swung up to an out-of-the-way "storage" position, and secured to the rake handle 10 by an upper spring clip 24. In FIG. 2, the shovel 20 is swung down to its working or shovel position, and secured to the rake handle 10 by a lower spring clip 25.

Figure 3:
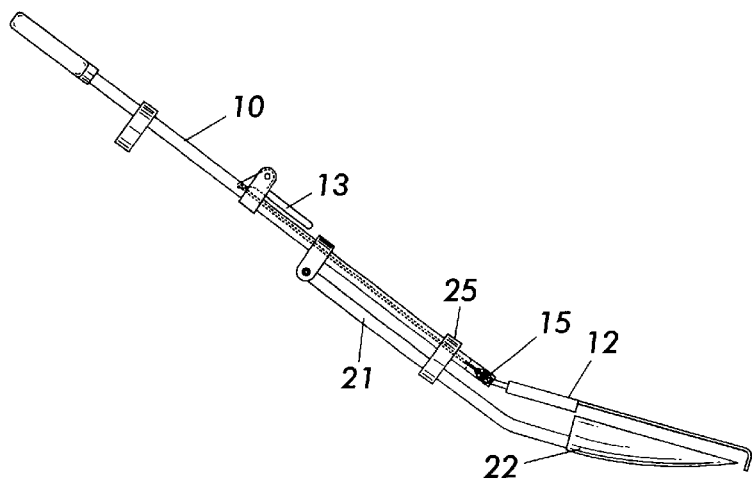
FIG. 3 is a side view of my shovel rake in condition to secure a load of leaves or grass within its grasp.

With reference to FIG. 3, consider the shovel head as containing a load of leaves or grass. To secure the load, the rake head is pulled into (or toward) its rake position, closing down on the leaves or grass and holding them in place in the shovel so the user can easily and cleanly dump the contents onto a sheet or into a container.

The term "shovel" in the following claims is intended to include, in addition to a continuous-bladed implement according to common usage, a finely-tined fork as is commonly used for handling silage, for example.

The foregoing description of a preferred embodiment of this invention, including any dimensions, angles, or proportions, is intended as illustrative. The concept and scope of the invention are limited only by the following claims and equivalents thereof.

What is claimed is:

1. A combination lawn rake and shovel, including:

a rake handle with a rake head pivotally mounted on the lower end thereof, on an axis perpendicular to said handle, for movement between a rake position and a raised position;

a rake control lever pivotally mounted on said rake handle and operatively connected to said rake head to move said rake head between said rake position and said raised position;

a shovel including a shovel handle with a shovel head on the lower end thereof, said shovel handle pivotally connected to said rake handle for movement between a shovel position and a storage position, wherein the shovel handle is connected to the rake handle at a location spaced-apart from the rake head end thereof and where the shovel handle traverses an obtuse angle as it is pivoted between the shovel position and the storage position; and locking means to secure said shovel handle to said rake handle alternatively in said shovel position and said storage position.

2. A combination lawn rake and shovel as defined in claim 1, in which said locking means includes upper and lower spring clips mounted on said rake handle.

3. A combination lawn rake and shovel as defined in claim 1, in which said shovel head is a continuous-bladed implement.

4. A combination lawn rake and shovel as defined in claim 1, in which said rake handle is operatively connected to said rake head using a multi-hinge linkage.

5. A combination lawn rake and shovel as defined in claim 4, wherein the multi-hinge linkage enables an angular range of motion of the rake head between the rake position and the raised position of up to about forty degrees.

6. A combination lawn rake and shovel, including:

a rake handle with a rake head pivotally mounted on the lower end thereof, on an axis perpendicular to said handle, for movement between a rake position and a raised position;

a rake control lever pivotally mounted on said rake handle and operatively connected to one end of a control rod, said control rod operatively connected at the other end thereof to said rake head to move said rake head between said rake position and said raised position in response to movement of said control lever;

a shovel including a shovel handle with a shovel head on the lower end thereof, said shovel handle pivotally connected to said rake handle for movement between a shovel position and a storage position, wherein the shovel handle is connected to the rake handle at a location spaced-apart from the rake head end thereof and where the shovel handle traverses an obtuse angle as it is pivoted between the shovel position and the storage position; and locking means to secure said shovel handle to said rake handle alternatively in said shovel position and said storage position.

7. A combination lawn rake and shovel as defined in claim 6, in which said locking means includes upper and lower spring clips mounted on said rake handle.

8. A combination lawn rake and shovel as defined in claim 6, in which said shovel head is a continuous-bladed implement.

9. A combination lawn rake and shovel, including:

a hollow rake handle with a rake head pivotally mounted on the lower end thereof, on an axis perpendicular to said handle, for movement between a rake position and a raised position;

a rake control lever pivotally mounted on said rake handle and operatively connected to one end of a control rod within said rake handle, said control rod operatively connected at the other end thereof to said rake head, whereby said control lever is effective to move said rake head between said rake position and said raised position;

a shovel including a shovel handle with a shovel head on the lower end thereof, said shovel handle pivotally connected to said rake handle for movement of said shovel head between a shovel position and a storage position, wherein the shovel handle is connected to the hollow rake handle at a location spaced-apart from the rake head end thereof and where the shovel handle traverses an obtuse angle as it is pivoted between the shovel position and the storage position; and locking means to secure said shovel handle to said rake handle alternatively in said shovel position and said storage position.

10. A combination lawn rake and shovel as defined in claim 9, in which said locking means includes upper and lower spring clips mounted on said rake handle.

11. A combination lawn rake and shovel as defined in claim 9, in which said shovel head is a continuous-bladed implement.

* * * * *